(12) United States Patent
Moratz

(10) Patent No.: US 9,657,781 B2
(45) Date of Patent: May 23, 2017

(54) ROBUST TOUCHDOWN BEARING

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 39 days.

(21) Appl. No.: 14/694,483

(22) Filed: Apr. 23, 2015

(65) Prior Publication Data
US 2016/0312828 A1    Oct. 27, 2016

(51) Int. Cl.
*F16C 19/00* (2006.01)
*F16C 43/04* (2006.01)
*F16C 33/66* (2006.01)
*F16C 39/02* (2006.01)
*F16C 33/20* (2006.01)
*F16C 33/58* (2006.01)

(52) U.S. Cl.
CPC ............ *F16C 43/04* (2013.01); *F16C 33/201* (2013.01); *F16C 33/586* (2013.01); *F16C 33/6696* (2013.01); *F16C 39/02* (2013.01)

(58) Field of Classification Search
CPC .......... F16C 19/02; F16C 19/04; F16C 19/06; F16C 19/08; F16C 19/22; F16C 19/24; F16C 19/26; F16C 19/28; F16C 33/58; F16C 33/62; F16C 43/04; F16C 33/586; F16C 33/6696
See application file for complete search history.

(56) References Cited

U.S. PATENT DOCUMENTS

| | | | | |
|---|---|---|---|---|
| 3,001,838 A * | 9/1961 | Lamson | .............. | F16C 33/6696 384/463 |
| 4,968,155 A | 11/1990 | Bode | | |
| 5,222,816 A * | 6/1993 | Kondoh | .................. | F16C 33/30 384/463 |
| 5,939,363 A * | 8/1999 | Toyota | .................... | F16C 33/62 508/104 |
| 7,942,581 B2 * | 5/2011 | Leonardelli | ........... | F16C 33/201 384/129 |

FOREIGN PATENT DOCUMENTS

JP    2006153240    6/2006
SE    CH464613    * 10/1968

OTHER PUBLICATIONS

U.S. Appl. No. 62/051,492, filed Sep. 17, 2014.
Fritzson, Dag and Lars-Erik Stacke, "Dynamic simulation—Building knowledge in product development." SKF Engineering & Research Centre, Bothenburg, Sweden, http://evolution.skf.com/category/technology, Dec. 2013.

* cited by examiner

*Primary Examiner* — James Pilkington
(74) *Attorney, Agent, or Firm* — Simpson & Simpson, PLLC

(57) ABSTRACT

A touchdown bearing for supporting a rotor including: an inner race having a first inner circumferential surface; a self-lubricating insert having a second inner circumferential surface and affixed to the first inner circumferential surface, the second inner circumferential surface extending radially inward past at least a first portion of the first inner circumferential surface, an outer race located radially outward of the inner race; and a plurality of rolling elements configured radially between the inner and outer races to enable the outer race to rotate freely relative to the inner race.

17 Claims, 5 Drawing Sheets

ROBUST TOUCHDOWN BEARING

TECHNICAL FIELD

The present invention relates generally to a bearing, and, more specifically to a touchdown bearing.

BACKGROUND

Bearings in touchdown applications are subjected to very large momentary shock loads when the rotors they are supporting touch down. Known main failure modes of touchdown bearings are: load at impact leading to indentation marks in the raceways (brinelling); shaft orbital motion ("whirl" movement) may give very heavy bearing loads, especially in the case of backward whirl; and, fast acceleration leading to high sliding power and smearing damage. Typically, in a touchdown application, a bearing with a full complement design is used. Ceramic roller balls are typically used in order to obtain a good performance at the extremely high accelerations that are also experienced at rotor touchdown. However, ceramic balls as rolling elements have a very high modulus of elasticity compared to steel balls, resulting in increased brinelling.

SUMMARY

According to aspects illustrated herein, there is provided a touchdown bearing, having an inner race having a first inner circumferential surface, a self-lubricating layer of material affixed to the first inner circumferential surface, an outer race located radially outward of the inner race, and, a plurality of rolling elements configured radially between the inner and outer races to enable the outer race to rotate freely relative to the inner race.

According to aspects illustrated herein, there is provided a touchdown bearing for supporting a rotor having an inner race having a first inner circumferential surface, a self-lubricating insert having a second inner circumferential surface and affixed to the first inner circumferential surface, the second inner circumferential surface extending radially inward past at least a first portion of the first inner circumferential surface, an outer race located radially outward of the inner race, and, a plurality of rolling elements configured radially between the inner and outer races to enable the outer race to rotate freely relative to the inner race.

According to aspects illustrated herein, there is provided a method for fabricating a touchdown bearing including the steps of positioning an outer race radially outward of an inner race, configuring a plurality of rolling elements radially between the inner and outer races to enable the outer race to rotate freely relative to the inner race, and, affixing a self-lubricating layer of material to a first inner circumferential surface of the inner race.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like character references on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the an to which this invention belongs. Although any methods, devices or materials similar or equivalent to those described herein can be used in the practice or testing of the invention, the preferred methods, devices, and materials are now described.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
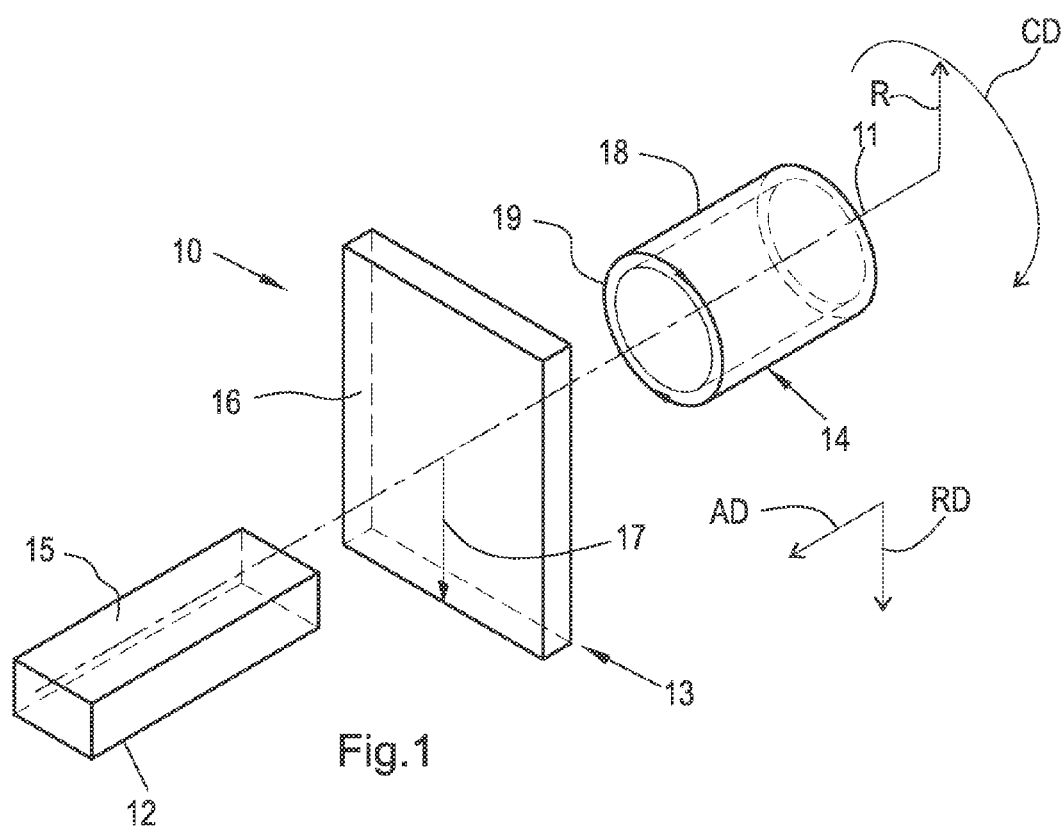
FIG. 1 is a perspective view of a cylindrical coordinate system demonstrating spatial terminology used in the present patent.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, Objects 12, 13, and 14 are used. An axial surface, such as surface 15 of object 12, is formed by a plane co-planar with axis 11. Axis 11 passes through planar surface 15; however any planar surface co-planar with axis 11 is an axial surface, A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
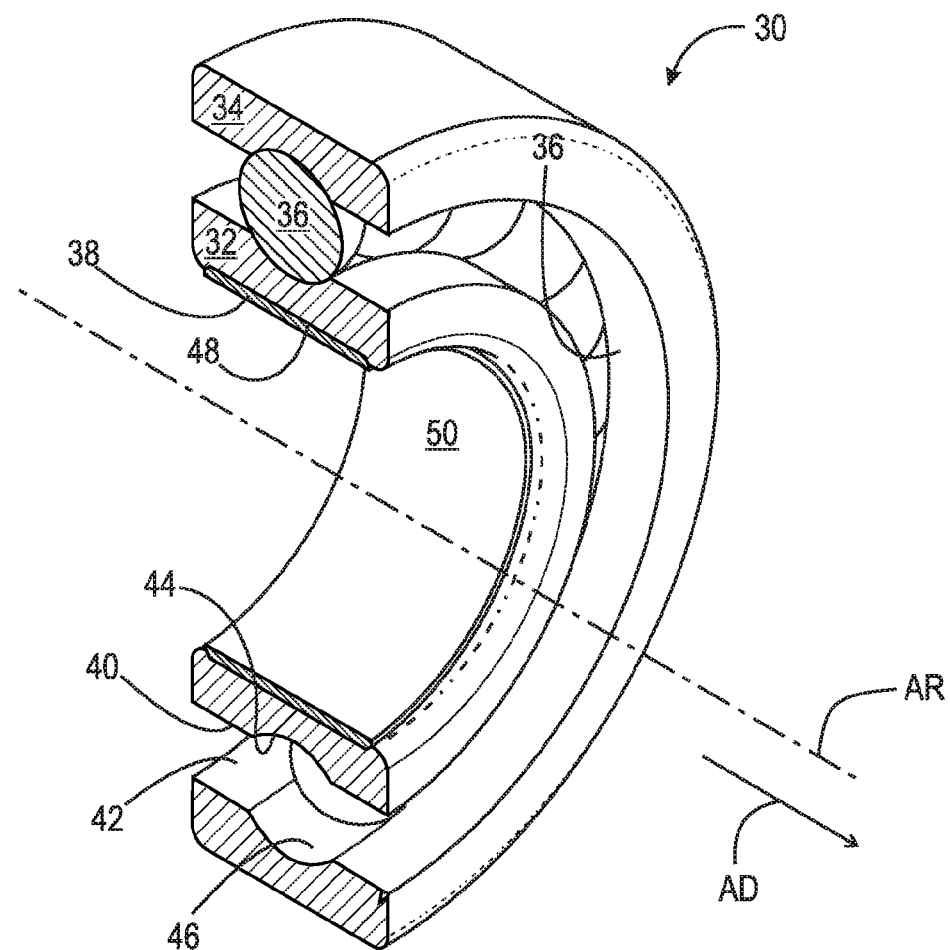
FIG. 2 is a perspective view of a cross-section of a touchdown bearing with a self-lubricating layer.

FIG. 2 is a perspective view of a cross-section of touchdown bearing 30 with a self-lubricating layer. Bearing 30 revolves around axis of rotation AR and has inner race 32, outer race 34, rolling elements 36, and self-lubricating layer 38. Rolling elements 36 are configured radially between outer circumferential surface 40 of the inner race and inner circumferential surface 42 of the outer race to enable outer race 34 to rotate freely relative to inner race 32. In an example embodiment, bearing 30 has a full complement design where rolling elements 36 are radially and axially contained by groove 44 in inner race 32 and groove 46 in outer race 34.

Self-lubricating layer 38 is affixed to inner circumferential surface 48 of inner race 32 such that inner circumferential surface 50 of layer 38 extends radially inward past at least one portion of inner circumferential surface 48. Inner circumferential surface 50 may be uniform, i.e., continuous without undercuts or channels, or may include undercuts or channels or other features necessary for securing self-lubricating layer 38.

In an example embodiment, self-lubricating layer 38 is made of a fluoropolymer. For example, the fluoropolymer can be selected from the group consisting of: polyvinyfluoride (PVF), polyvinylidene fluoride (PVDF), polytetrafluoroethylene (PTFE), polychlorotrifluoroethylene WIFE), perfluoroalkoxy polymer (PFA, MFA), fluorinated ethylenepropylene (FEP), polyethytenetetrafluoroethylene (ETFE), polyethylenechlorotrifluoroethylene (ECTFE), perfluorinated elastomer (FFPM/FFKM), fluorocarbon chlorotrifluoroethylenevinylidene fluoride (FPM/FKM), perfluoropolyether (PFPE), perfluorosulfonic acid (PFSA), and perfluoropolyoxetane.

Figure 3:
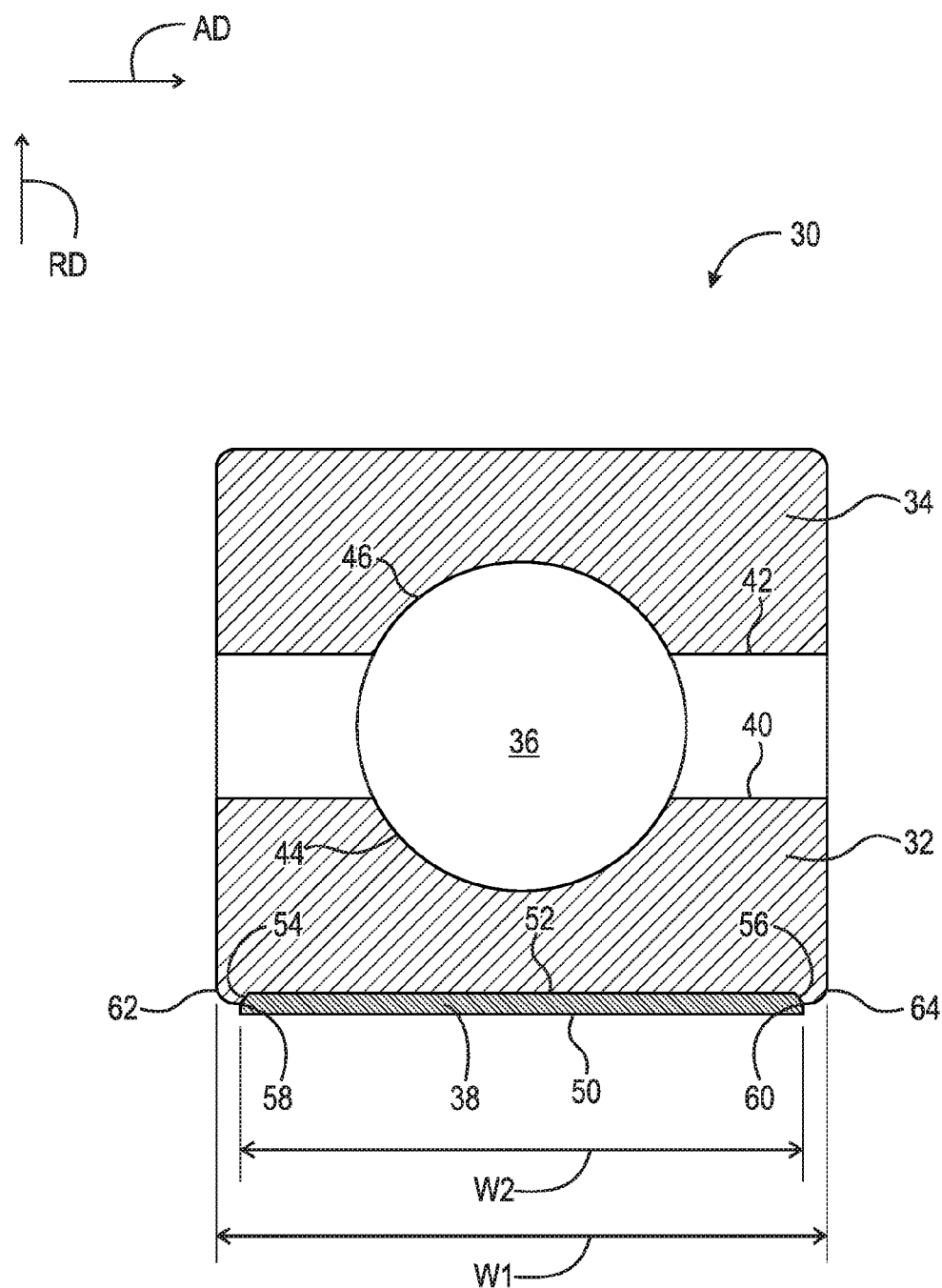
FIG. 3 is a cross-section of the touchdown bearing shown in FIG. 3.

FIG. 3 is a cross-section of bearing 30 with self-lubricating layer 38. In an example embodiment, bearing 30 includes channel 52 on inner circumferential surface 48 of inner race 32 and self-lubricating layer 38 is an insert that is disposed within channel 52. Channel 52 has axial ends 54 and 56 tapering radially outward and toward each other. Self-lubricating layer 38 has tapered surfaces 58 and 60 fixed to axial ends 56 and 58 of channel 52, respectively.

In an example embodiment, insert 38 has an appreciable thickness to aid in the damping properties of bearing 30. By protruding radially inward past inner circumferential surface 48, insert 38 can isolate the internal components from shock and help prevent brinelling. In this way, insert 38 decreases friction and provides damping.

In an example embodiment, insert 38 spans most of axial extent, or length, W1 of inner race 32. Inner race 32 has axial ends 62 and 64 defining axial extent W1. Self-lubricating layer 38 has axial extent W2, which is less than axial extent W1 of inner race 32.

Figure 4:
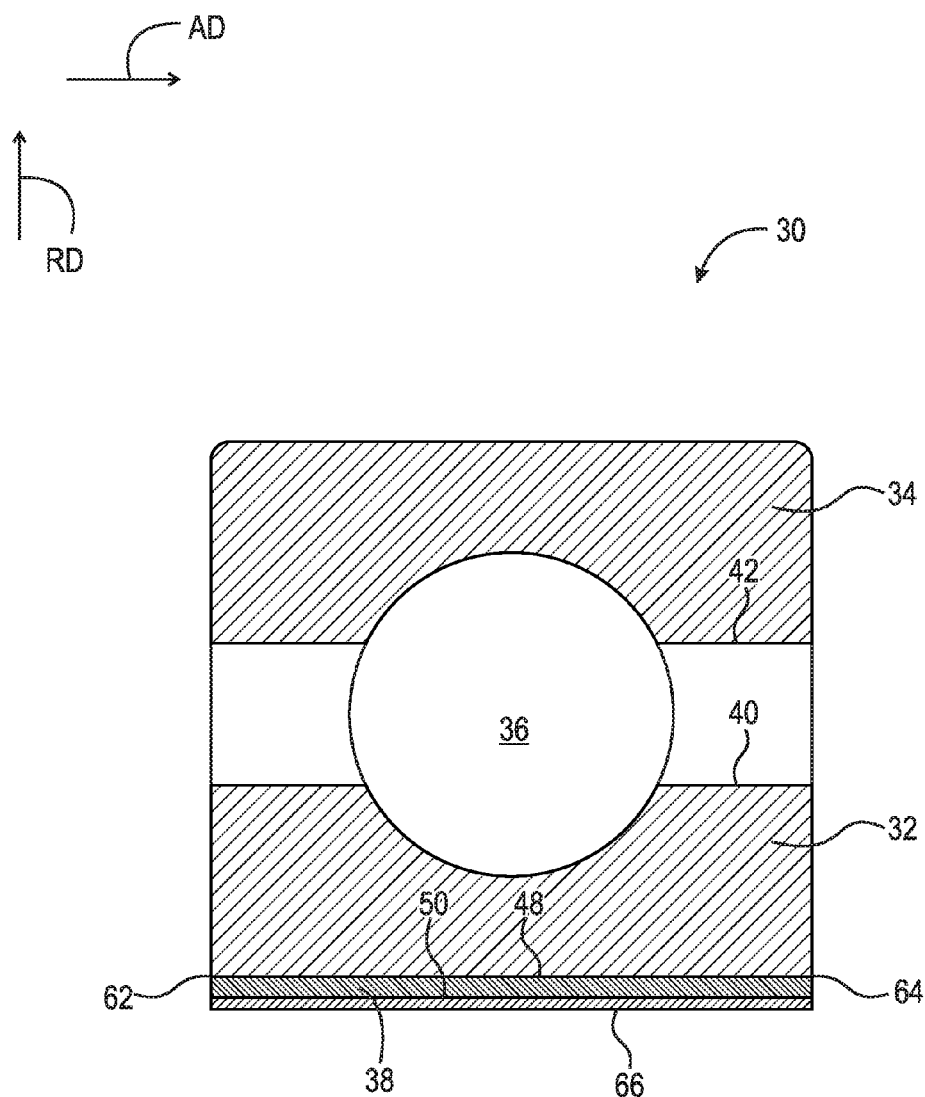
FIG. 4 is a cross-section of a touchdown bearing with a self-lubrication layer; and, FIG. 5 is a perspective view of a touchdown bearing, with a self-lubricating layer, disposed about a rotor.

FIG. 4 is a cross-section of bearing 30 with self-lubricating layer 38.

Figure 5:
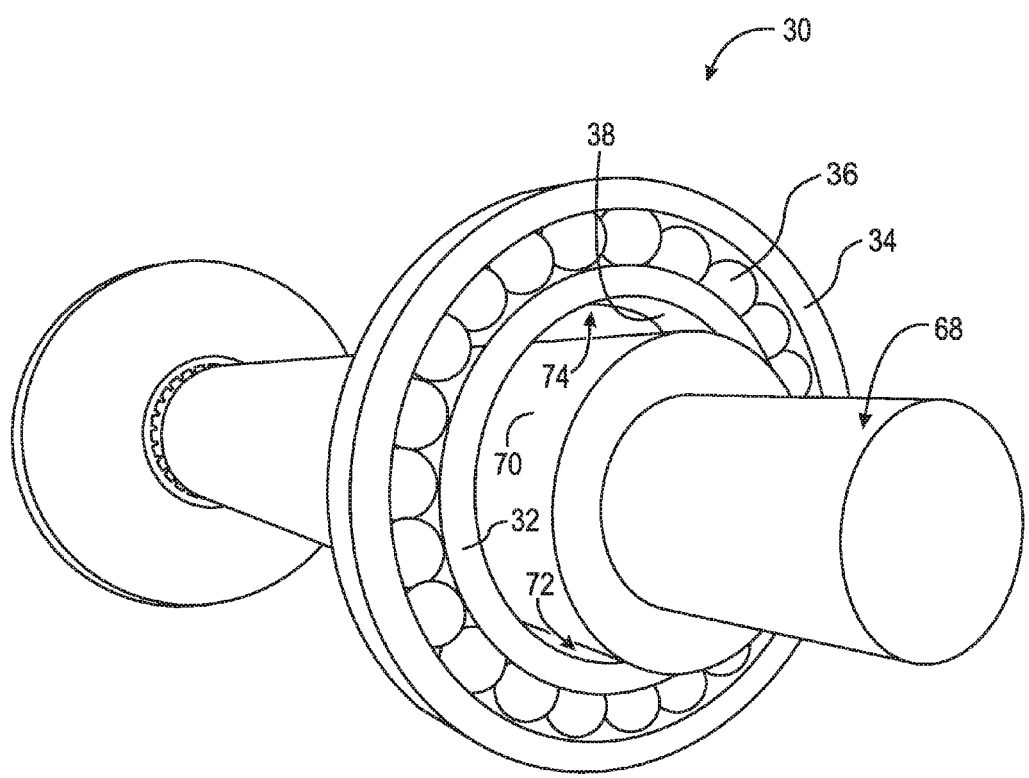

FIG. 5 is a perspective view of touchdown bearing 30, with self-lubricating layer 38, disposed about rotor (or shaft) 68. In an example embodiment, inner circumferential surface 48 of the inner race is at a uniform radial distance from axis of rotation AR and self-lubricating layer 38 is a coating applied to surface 48. Adding self-lubricating layer 38 as a coating provides the material with an increased lubricity and the ability to slide with the least possible amount of friction against shaft 68. To optimize this effect, the rotating shaft should be finished with a fine surface finish, for example, with an approximate surface roughness value Ra between 4 μm and 8 μm. Layer 38 is shown spanning the entire axial extent of surface 48 in FIG. 4; however, it should be understood that layer 38 as a coating can span less than the entire axial extent of surface 48.

In an example embodiment, extra layer 66 is affixed to inner surface 50 of self-lubricating layer 38. Extra layer 66 extends radially inward past at least a portion of the inner surface 50 of self-lubricating layer 38 and can be a graphite layer, a moly disulphide layer, or a layer of anti-galling paste. Extra layer 66 is shown in FIG. 4 in combination with layer 38 as a coating, however, extra layer 66 can also be used in combination with layer 38 as an insert.

In FIG. 5, touchdown bearing 30 is a plain bearing arranged to support rotating shaft 68 with inner surface 48. Outer diameter 70 of shaft 68 is arranged such that when shaft 68 is in contact with a portion of self-lubricating layer 38, gap 74 is formed between shaft 68 and self-lubricating layer 38 at a portion of self-lubricating layer 38 that is 180 degrees from the portion of surface 38 in contact with the shaft.

In an example embodiment, inner race 32 is a sliding bearing arranged to support a slide member with inner circumferential surface 48 as the slide member moves in axial direction AD. Outer diameter 70 of shaft 68 is arranged such that when shaft 68 is in contact 72 with a portion of self-lubricating layer 38, gap 74 is formed between shaft 68 and self-lubricating layer 38 at a portion of self-lubricating layer 38 that is 180 degrees from the portion of surface 38 in contact with the shaft.

Affixing layer 38 as a fluoropolymer to inner circumferential surface 48 is done by means known in the art. For example, layer 38 can be affixed using a snap-fit technique, press-fit technique, inset molding, potting, adhesive bonding, melt bonding, ultrasonic welding, or thermal welding.

Advantageously, bearing 30 reduces or eliminates the problems noted above related to shock loads for a touchdown bearing. For example, layer 38 provides extra cushioning and damping to reduce vibration, and the lubricating aspects of layer 38 enable bearing 30 to slide with respect to the shaft to reduce shaft orbital motion. The lubricating operation of layer 38 is contrary to the normal and expected operation of a bearing, in which the inner and outer races are deliberately non-rotatably connected to respective components to enable relative rotation between the components.

The following should be viewed in light of FIGS. 2 through 5. A method for fabricating touchdown bearing 30 is also provided. Although the method is presented as a sequence of steps for clarity, no order should be inferred from the sequence unless explicitly stated. The method has the steps of positioning outer race 34 radially outward of inner race 32, configuring rolling elements 36 radially between inner race 32 and outer race 34 to enable outer race 34 to rotate freely relative to inner race 32. Further steps include affixing self-lubricating layer 38 of material to inner circumferential surface 48 of the inner race, and, extending inner circumferential surface 50 of layer 38 radially inward past at least one first portion of inner surface 48 of the inner race.

In an example embodiment, the method has the step of applying self-lubricating layer 38 as a coating along inner surface 48 of the inner race.

In an example embodiment, inner circumferential surface 48 of inner race 32 includes a channel, self-lubricating layer 38 is an insert; and, the method further comprises the step of disposing insert 38 in channel 52.

In an example embodiment, the method further comprises the steps of affixing extra layer 66 to inner circumferential surface 50 of self-lubrication layer 38 with extra layer 66 made from a substance selected from the group consisting of graphite, molydisulphide, and anti-galling paste; and, extending extra layer 66 radially inward past at least a portion of the inner circumferential surface 50 of self-lubrication layer 38.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A touchdown bearing, comprising:
an inner race having a first inner circumferential surface;
a self-lubricating layer of material affixed to the first inner circumferential surface;
an outer race located radially outward of the inner race; and,
a plurality of rolling elements configured radially between the inner and outer races to enable the outer race to rotate freely relative to the inner race;
wherein:
the inner race has a first axial end, a second axial end, and a first axial extent between the first and second ends; and,
the self-lubricating layer of material has a second axial extent, less than the first axial extent.

2. The touchdown bearing of claim 1, wherein the self-lubricating layer of material has a second inner circumferential surface extending radially inward past at least one first portion of the first inner circumferential surface.

3. The touchdown bearing of claim 1, wherein the self-lubricating layer is a coating applied to the first inner circumferential surface.

4. The touchdown bearing of claim 1, wherein:
the first inner circumferential surface includes a channel; and,
the self-lubricating layer is an insert fixedly disposed in the channel.

5. The touchdown bearing of claim 4, wherein the channel has a third axial end and a fourth axial end, the third and fourth axial ends tapering radially outward and toward each other.

6. The touchdown bearing of claim 5, wherein the insert has a first surface and a second surface, the first and second surfaces fixed to the third and fourth axial ends, respectively.

7. The touchdown bearing of claim 1, wherein the self-lubricating layer of material is made of a fluoropolymer selected from the group consisting of: polyvinylfluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylenechlorotrifluoroethylene, perfluorinated elastomer, fluorocarbon chlorotrifluoroethylenevinylidene fluoride, perfluoropolyether, perfluorosulfonic acid, and perfluoropolyoxetane.

8. The touchdown bearing of claim 1, wherein the self-lubricating layer includes a second inner circumferential surface, the touchdown bearing further comprising:
a second layer affixed to the second inner circumferential surface of the self-lubrication layer and extending radially inward past at least a portion of the second inner circumferential surface, the second layer made from a substance selected from the group consisting of graphite, moly disulphide, and anti-galling paste.

9. A touchdown bearing for supporting a rotor, comprising:
an inner race having a first axial extent, the inner race including a first inner circumferential surface;
a self-lubricating insert:
having a second inner circumferential surface; and,
affixed to the first inner circumferential surface, the second inner circumferential surface extending radially inward past at least a first portion of the first inner circumferential surface, the self-lubricating insert having a second axial extent, less than the first axial extent;
an outer race located radially outward of the inner race; and,
a plurality of rolling elements configured radially between the inner and outer races to enable the outer race to rotate freely relative to the inner race, and wherein: the first inner circumferential surface has a channel; and, the self-lubricating insert is fixedly disposed in the channel.

10. The touchdown bearing of claim 9, wherein the channel has a first axial end and a second axial end, the first and second axial ends tapering radially outward and toward each other.

11. The touchdown bearing of claim 10, wherein the insert has a first surface and a second surface, the first and second surfaces fixed to the first and second axial ends, respectively.

12. The touchdown bearing of claim 9, wherein the inner race has a first axial end and a second axial end, and the first axial extent is arranged between the first and second axial ends.

13. A method for fabricating a touchdown bearing, comprising:
positioning an outer race radially outward of an inner race;
configuring a plurality of rolling elements radially between the inner and outer races to enable the outer race to rotate freely relative to the inner race;
forming a channel in a first inner circumferential surface of the inner race, the channel having a first axial end and a second axial end, the first and second axial ends tapering radially outward and toward each other; and,
affixing a self-lubricating layer of material in the channel.

14. The method of claim 13, wherein affixing the self-lubricating layer of material in the channel includes applying a coating to the channel.

15. The method of claim 13, wherein:
the self-lubricating layer of material has a first surface and a second surface; and,
affixing the self-lubricating layer of material in the channel includes fixing the first and second surfaces to the first and second axial ends, respectively.

16. The method of claim 13, further comprising:
extending a second inner circumferential surface of the self-lubricating layer radially inward past at least one first portion of the first inner circumferential surface.

17. The method of claim 16, further comprising:
affixing a second layer to the second inner circumferential surface of the self-lubrication layer; and,
extending the second layer radially inward past at least a portion of the second inner circumferential surface, wherein the second layer is made from a substance selected from the group consisting of graphite, moly disulphide, and anti-galling paste.

* * * * *